United States Patent
Li et al.

(10) Patent No.: US 12,206,685 B2
(45) Date of Patent: Jan. 21, 2025

(54) NETWORK SECURITY PROTECTION METHOD AND PROTECTION DEVICE

(71) Applicant: Huawei Technologies Co., Ltd., Shenzhen (CN)

(72) Inventors: Qiang Li, Beijing (CN); Wu Jiang, Beijing (CN); Jianwei Yu, Hangzhou (CN); Yu Huai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 17/851,195

(22) Filed: Jun. 28, 2022

(65) Prior Publication Data

US 2022/0329609 A1    Oct. 13, 2022

Related U.S. Application Data

(63) Continuation of application No. PCT/CN2020/114685, filed on Sep. 11, 2020.

(30) Foreign Application Priority Data

Dec. 31, 2019  (CN) .......................... 201911408206.7

(51) Int. Cl.
*H04L 9/40* (2022.01)
(52) U.S. Cl.
CPC ...... *H04L 63/1416* (2013.01); *H04L 63/0236* (2013.01); *H04L 63/1425* (2013.01); *H04L 63/1466* (2013.01)
(58) Field of Classification Search
None
See application file for complete search history.

(56) References Cited

U.S. PATENT DOCUMENTS

2012/0257529 A1  10/2012  Ehara et al.
2014/0310398 A1*  10/2014  Zhou .................... H04L 41/0894
                                          709/224
(Continued)

FOREIGN PATENT DOCUMENTS

CN    102668467 B    4/2015
CN    104901960 A    9/2015
(Continued)

OTHER PUBLICATIONS

"Data Sheet, Arbor Networks APS; Always on, in-line, Intelligently Automated DDOS Protection," 2017, 4 pages.
(Continued)

*Primary Examiner* — William J. Goodchild
(74) *Attorney, Agent, or Firm* — Conley Rose, P.C.

(57) ABSTRACT

A network security protection method includes receiving a first data flow, where the first data flow includes a source Internet Protocol (IP) address and a destination IP address, where the source IP address is an IP address of a first electronic device, and where the destination IP address is an IP address of a first server, determining first device attribute information corresponding to the source IP address, determining second device attribute information corresponding to the destination IP address, and forwarding the first data flow when the first device attribute information matches the second device attribute information or blocking the first data flow when the first device attribute information does not match the second device attribute information.

20 Claims, 7 Drawing Sheets

(56) References Cited

U.S. PATENT DOCUMENTS

2016/0142293 A1     5/2016   Hu et al.
2020/0092704 A1*   3/2020   Singh ........................ H04L 9/50

FOREIGN PATENT DOCUMENTS

| CN | 105991628 A | 10/2016 |
|----|-------------|---------|
| CN | 106714076 A | 5/2017 |
| CN | 107426168 A | 12/2017 |
| CN | 107465651 A | 12/2017 |
| CN | 107493276 A | 12/2017 |
| CN | 108521408 A | 9/2018 |
| CN | 109587156 A | 4/2019 |
| JP | 2001057554 A | 2/2001 |
| JP | 2004038557 A | 2/2004 |
| JP | 2006148778 A | 6/2006 |
| JP | 2010109731 A | 5/2010 |
| JP | 2011024019 A | 2/2011 |
| WO | 0221800 A1 | 3/2002 |

OTHER PUBLICATIONS

"Data Sheet, Atlas Intelligence Feed; A smarter response to security and availability threats.," 2017, 4 pages.
"DDoS Attack Mitigation Technologies Demystified," WhitePaper, 2017, 9 pages.

* cited by examiner

NETWORK SECURITY PROTECTION METHOD AND PROTECTION DEVICE

CROSS-REFERENCE TO RELATED APPLICATIONS

This is a continuation of International Patent Application No. PCT/CN2020/114685 filed on Sep. 11, 2020, which claims priority to Chinese Patent Application No. 201911408206.7 filed on Dec. 31, 2019. The disclosures of the aforementioned applications are hereby incorporated by reference in their entireties.

TECHNICAL FIELD

This disclosure relates to the field of communications technologies, and more specifically, to a network security protection method and a protection device.

BACKGROUND

A security protection device may provide a network security defense service for various types of service servers, to protect the service servers from hacker attacks. The security protection device is disposed between a client and a to-be-protected service server. A large quantity of data flows generated by the client first enter the security protection device. The security protection device filters out an abnormal data flow to obtain a secure data flow, so that the secure data flow enters the service server. In the field of computer network technologies, a data flow (or also referred to as a packet flow) is a series of packets from a source computer to a destination party, where the destination party is a computer, a multicast group, or a broadcast domain.

Currently, the security protection device uses a blacklist mechanism to filter the data flows. The security protection device stores a preset Internet Protocol (IP) threat database, and the IP threat database includes an IP address. After the security protection device receives a large quantity of data flows sent by the client, the security protection device determines whether source IP addresses in the data flows exist in the IP threat database. If a source IP address A of one of the data flows exists in the IP threat database, the security protection device considers that the IP address A is an offensive IP address, and the security protection device blocks the data flow, to protect the service server from a hacker attack. The security protection device determines that an IP address that is not in the IP threat database is secure, and does not block a data flow whose source IP address is an IP address that is not in the IP threat database.

The IP addresses stored in the IP threat database are relatively limited, and many offensive IP addresses are not stored in the IP threat database. Therefore, an existing security protection device may miss many offensive data flows, resulting in low protection accuracy of the existing security protection device.

SUMMARY

Embodiments of this disclosure provide a network security protection method and a protection device, to accurately identify whether a data flow is offensive.

According to a first aspect, an embodiment of this disclosure provides a network security protection method. The method includes the following steps: receiving a first data flow, where the first data flow includes a source IP address and a destination IP address, the source IP address is an IP address of a first electronic device, and the destination IP address is an IP address of a first server; determining first device attribute information corresponding to the source IP address, where the first device attribute information includes a first device type and a first service type, the first device type is a device type of the first electronic device, and the first service type is a service type that can be accessed by the first device type; determining second device attribute information corresponding to the destination IP address, where the second device attribute information includes a second device type and a second service type, the second device type is a device type allowed to access the first server, and the second service type is a service type of a service provided by the first server; and forwarding the first data flow when the first device attribute information matches the second device attribute information, or blocking the first data flow when the first device attribute information does not match the second device attribute information.

In the first aspect, if the first device attribute information matches the second device attribute information, it indicates that the first electronic device meets a requirement of the first server. In other words, the first data flow is a secure and non-offensive data flow. Therefore, the first data flow is forwarded. If the first device attribute information does not match the second device attribute information, it indicates that the first electronic device does not meet a requirement of the first server. In other words, the first data flow is an insecure and offensive data flow. Therefore, the first data flow needs to be blocked. Therefore, according to the solution provided in this embodiment of this disclosure, whether a data flow sent by an electronic device is offensive can be accurately identified, and an offensive data flow can be blocked, so that a secure data flow enters a service server. Therefore, protection accuracy of the solution provided in this embodiment of this disclosure is relatively high.

Optionally, in a possible implementation of the first aspect, before the determining first device attribute information corresponding to the source IP address, the method further includes: determining a detection identifier corresponding to the destination IP address in the first data flow, where the detection identifier is a first identifier or a second identifier, the first identifier is used to indicate that the first server is currently attacked, and the second identifier is used to indicate that the first server is not currently attacked; and when the detection identifier is the first identifier, determining a risk value corresponding to the source IP address, and blocking the first data flow when the risk value corresponding to the source IP address falls within a first risk range, or when the risk value corresponding to the source IP address falls within a second risk range, performing a step of determining the first device attribute information corresponding to the source IP address, where a minimum value in the first risk range is greater than a maximum value in the second risk range, or a minimum value in the second risk range is greater than a maximum value in the first risk range, and risks indicated by risk values in the first risk range are all higher than risks indicated by risk values in the second risk range; or forwarding the first data flow when the detection identifier is the second identifier.

When the detection identifier corresponding to the destination IP address is the first identifier, it indicates that the first server is currently attacked. Therefore, the risk value corresponding to the source IP address needs to be determined. When the detection identifier corresponding to the destination IP address is the second identifier, it indicates that the first server is not currently attacked. Therefore, whether the first data flow is an offensive data flow does not need to be detected, the first data flow may be directly forwarded, and a step of detecting whether the first data flow is an offensive data flow is omitted. In this way, processing resources of a protection device are reduced, a transmission delay caused by detecting whether the first data flow is an offensive data flow is reduced, and service response timeliness is improved. When the risk value corresponding to the source IP address falls within the first risk range, it indicates that the source IP address is more likely to attack the first server. Therefore, the protection device blocks the first data flow, to prevent the first server from being attacked by the first data flow. When the risk value corresponding to the source IP address falls within the second risk range, it indicates that the source IP address is less likely to attack the first server, but the first data flow cannot be considered secure. Therefore, the protection device continues to detect whether the first data flow is offensive. If it is determined that the first data flow is offensive, the first data flow may be blocked, to prevent the first server from being attacked by the first data flow.

Optionally, in a possible implementation of the first aspect, before the determining first device attribute information corresponding to the source IP address, the method further includes: determining a risk value corresponding to the source IP address; and blocking the first data flow when the risk value corresponding to the source IP address falls within a first risk range, or when the risk value corresponding to the source IP address falls within a second risk range, performing a step of determining the first device attribute information corresponding to the source IP address, where a minimum value in the first risk range is greater than a maximum value in the second risk range, or a minimum value in the second risk range is greater than a maximum value in the first risk range, and risks indicated by risk values in the first risk range are all higher than risks indicated by risk values in the second risk range.

When the risk value corresponding to the source IP address falls within the first risk range, it indicates that the source IP address is more likely to attack the first server. Therefore, a protection device blocks the first data flow, to prevent the first server from being attacked by the first data flow. When the risk value corresponding to the source IP address falls within the second risk range, it indicates that the source IP address is less likely to attack the first server, but the first data flow cannot be considered secure. Therefore, the protection device continues to detect whether the first data flow is offensive. If it is determined that the first data flow is offensive, the first data flow may be blocked, to prevent the first server from being attacked by the first data flow.

Optionally, in a possible implementation of the first aspect, before the determining first device attribute information corresponding to the source IP address, the method further includes: determining a detection identifier corresponding to the destination IP address in the first data flow, where the detection identifier is a first identifier or a second identifier, the first identifier is used to indicate that the first server is currently attacked, and the second identifier is used to indicate that the first server is not currently attacked; and when the detection identifier is the first identifier, performing a step of determining the first device attribute information corresponding to the source IP address, or forwarding the first data flow when the detection identifier is the second identifier.

When the detection identifier corresponding to the destination IP address is the first identifier, it indicates that the first server is currently attacked. Therefore, whether the first data flow is an offensive data flow needs to be detected. If it is determined that the first data flow is offensive, the first data flow may be blocked, to prevent the first server from being attacked by the first data flow. When the detection identifier corresponding to the destination IP address is the second identifier, it indicates that the first server is not currently attacked. Therefore, whether the first data flow is an offensive data flow does not need to be detected, the first data flow may be directly forwarded, and a step of detecting whether the first data flow is an offensive data flow is omitted. In this way, processing resources of a protection device are reduced, a transmission delay caused by detecting whether the first data flow is an offensive data flow is reduced, and service response timeliness is improved.

According to a second aspect, an embodiment of this disclosure provides a network security protection method. The method includes the following steps: receiving a first data flow, where the first data flow includes a source IP address and a destination IP address, the source IP address is an IP address of a first electronic device, and the destination IP address is an IP address of a first server; determining a risk value corresponding to the source IP address; and blocking the first data flow when the risk value corresponding to the source IP address falls within a first risk range, or when the risk value corresponding to the source IP address falls within a second risk range, determining, based on the source IP address and the destination IP address, to forward or block the first data flow, where a minimum value in the first risk range is greater than a maximum value in the second risk range, or a minimum value in the second risk range is greater than a maximum value in the first risk range, and risks indicated by risk values in the first risk range are all higher than risks indicated by risk values in the second risk range.

In the second aspect, when the risk value corresponding to the source IP address falls within the first risk range, it indicates that the source IP address is more likely to attack the first server. Therefore, a protection device blocks the first data flow, to prevent the first server from being attacked by the first data flow. When the risk value corresponding to the source IP address falls within the second risk range, it indicates that the source IP address is less likely to attack the first server, but the first data flow cannot be considered secure. Therefore, the protection device continues to detect whether the first data flow is offensive. If it is determined that the first data flow is offensive, the first data flow may be blocked, to prevent the first server from being attacked by the first data flow.

Optionally, in a possible implementation of the second aspect, the determining, based on the source IP address and the destination IP address, to forward or block the first data flow includes: determining first device attribute information corresponding to the source IP address, where the first device attribute information includes a first device type and a first service type, the first device type is a device type of the first electronic device, and the first service type is a service type that can be accessed by the first device type; determining second device attribute information corresponding to the destination IP address, where the second device attribute information includes a second device type and a second service type, the second device type is a device type allowed to access the first server, and the second service type is a service type of a service provided by the first server; and forwarding the first data flow when the first device attribute information matches the second device attribute information, or blocking the first data flow when the first device attribute information does not match the second device attribute information.

If the first device attribute information matches the second device attribute information, it indicates that the first electronic device meets a requirement of the first server. In other words, the first data flow is a secure and non-offensive data flow. Therefore, the first data flow is forwarded. If the first device attribute information does not match the second device attribute information, it indicates that the first electronic device does not meet a requirement of the first server. In other words, the first data flow is an insecure and offensive data flow. Therefore, the first data flow needs to be blocked. Therefore, according to the solution provided in this embodiment of this disclosure, whether a data flow sent by an electronic device is offensive can be accurately identified, and an offensive data flow can be blocked, so that a secure data flow enters a service server. Therefore, protection accuracy of the solution provided in this embodiment of this disclosure is relatively high.

Optionally, in a possible implementation of the second aspect, before the determining first device attribute information corresponding to the source IP address, the method further includes: determining a detection identifier corresponding to the destination IP address in the first data flow, where the detection identifier is a first identifier or a second identifier, the first identifier is used to indicate that the first server is currently attacked, and the second identifier is used to indicate that the first server is not currently attacked; and when the detection identifier is the first identifier, performing a step of determining the first device attribute information corresponding to the source IP address, or forwarding the first data flow when the detection identifier is the second identifier.

When the detection identifier corresponding to the destination IP address is the first identifier, it indicates that the first server is currently attacked. Therefore, whether the first data flow is an offensive data flow needs to be detected. If it is determined that the first data flow is offensive, the first data flow may be blocked, to prevent the first server from being attacked by the first data flow. When the detection identifier corresponding to the destination IP address is the second identifier, it indicates that the first server is not currently attacked. Therefore, whether the first data flow is an offensive data flow does not need to be detected, the first data flow may be directly forwarded, and a step of detecting whether the first data flow is an offensive data flow is omitted. In this way, processing resources of the protection device are reduced, a transmission delay caused by detecting whether the first data flow is an offensive data flow is reduced, and service response timeliness is improved.

According to a third aspect, an embodiment of this disclosure provides a protection device. The protection device includes a network interface, a memory, and a processor that is connected to the memory. The memory is configured to store instructions. The processor is configured to execute the instructions, so that the protection device is enabled to perform the method according to any one of the first aspect or the possible implementations of the first aspect, or the method according to any one of the second aspect or the possible implementations of the second aspect. For details, refer to the foregoing detailed description. Details are not described herein again.

According to a fourth aspect, an embodiment of this disclosure provides a protection device. The protection device has a function of implementing the method according to the first aspect, any possible implementation of the first aspect, the method according to the second aspect, or any possible implementation of the second aspect. The function may be implemented by hardware, or may be implemented by hardware executing corresponding software. The hardware or the software includes one or more modules corresponding to the function.

According to a fifth aspect, an embodiment of this disclosure provides a computer storage medium, configured to store computer software instructions used by the foregoing protection device. The computer storage medium includes a program designed to perform the method according to the first aspect, any possible implementation of the first aspect, the second aspect, or any possible implementation of the second aspect.

According to a sixth aspect, an embodiment of this disclosure provides a computer program product including instructions. When the computer program product runs on a computer, the computer is enabled to perform the methods according to the foregoing aspects.

According to a seventh aspect, an embodiment of this disclosure provides a chip, including a memory and a processor. The memory is configured to store computer instructions. The processor is configured to invoke the computer instructions from the memory and run the computer instructions, to perform the method according to any one of the first aspect or the possible implementations of the first aspect or the method according to any one of the second aspect or the possible implementations of the second aspect.

DESCRIPTION OF EMBODIMENTS

Figure 1:
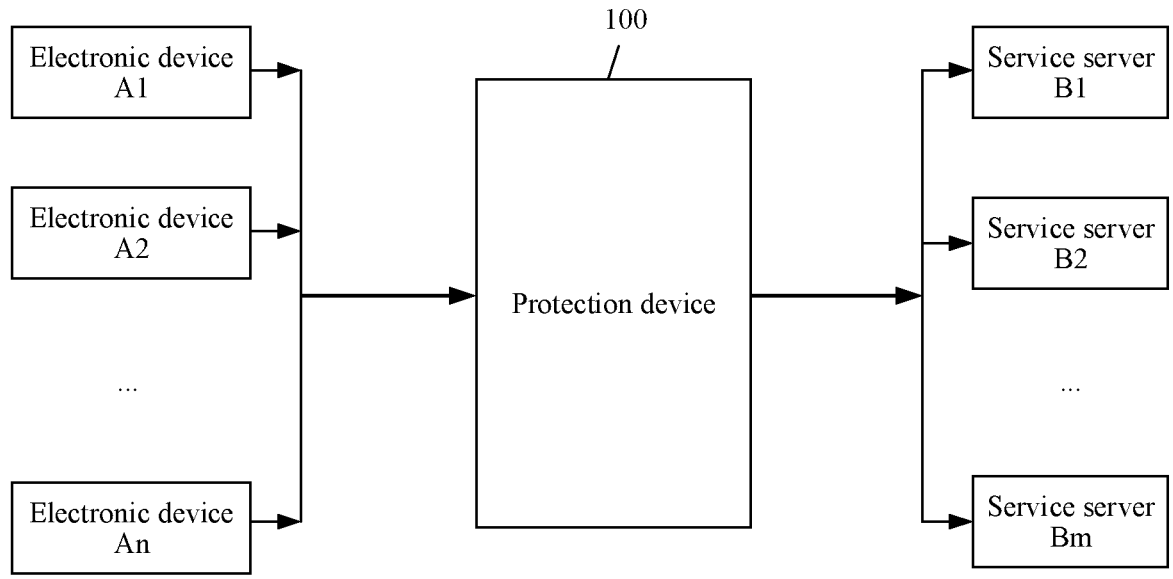
FIG. 1 is a schematic diagram of a scenario to which a network security protection method according to an embodiment of this disclosure is applicable.

FIG. 1 is a schematic diagram of a scenario to which a network security protection method according to an embodiment of this disclosure is applicable. The scenario to which the network security protection method provided in this embodiment of this disclosure is applicable is not limited to an example shown in FIG. 1.

In the example shown in FIG. 1, a protection device 100 includes but is not limited to devices such as a firewall and a security gateway. The protection device 100 is disposed between a plurality of electronic devices (A1, A2, ..., An) and at least one service server. The at least one service server is a plurality of service servers (B1, B2, ..., Bm) shown in FIG. 1, or a cluster including a plurality of service servers. A plurality of data flows sent by the plurality of electronic devices (A1, A2, ..., An) first enter the protection device 100, and the protection device 100 identifies and filters the plurality of data flows. For example, the protection device 100 blocks an offensive data flow, and forwards (also referred to as "release") a non-offensive data flow. The protection device may ensure that data flows entering the plurality of service servers (B1, B2, ..., Bm) are relatively secure.

Figure 2:
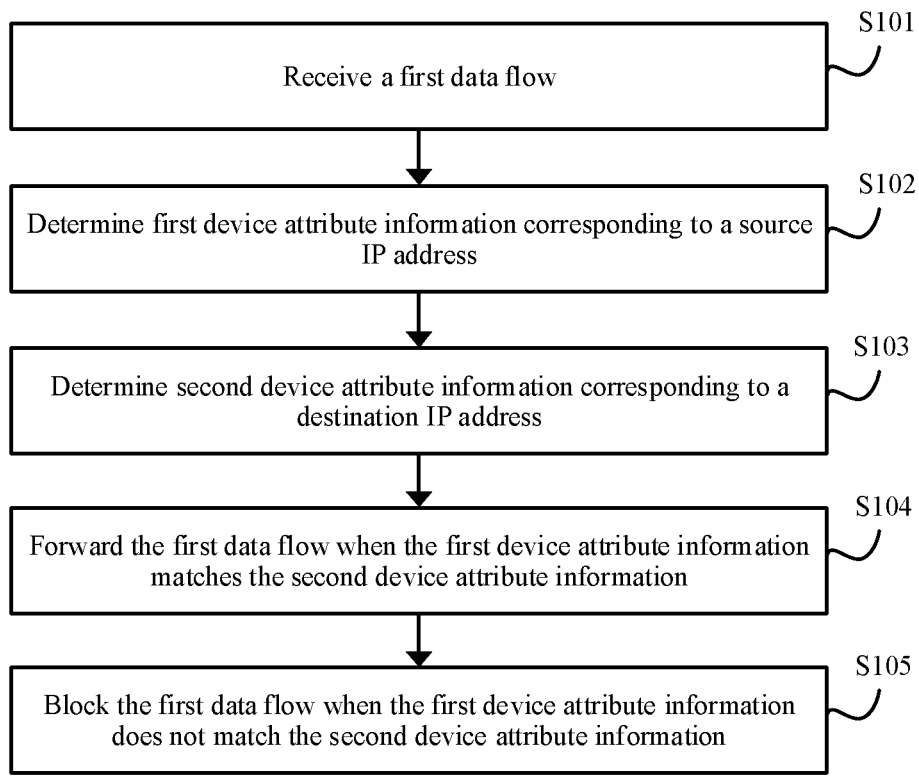
FIG. 2 is a flowchart of a network security protection method according to an embodiment of this disclosure.

FIG. 2 is a flowchart of a network security protection method according to an embodiment of this disclosure. The network security protection method shown in FIG. 2 includes the following steps S101 to S105. Optionally, the network security protection method shown in FIG. 2 is performed by the protection device 100 in FIG. 1.

S101: Receive a first data flow.

The protection device receives a data flow of an electronic device accessing a service server. One data flow includes a plurality of data packets. Each of the plurality of data packets of the data flow includes a source IP address and a destination IP address, and any two of the plurality of data packets of the data flow include a same source IP address and a same destination IP address.

In S101, the first data flow includes a source IP address and a destination IP address, the source IP address is an IP address of a first electronic device, and the destination IP address is an IP address of a first server.

For example, with reference to FIG. 1, it is assumed that the electronic device A1 is a terminal controlled by a hacker. The electronic device A1 generates an offensive data flow X1, and the data flow X1 is used to attack the service server B1. The data flow X1 includes a source IP address (10.10.10.11) and a destination IP address (20.20.20.21), the source IP address (10.10.10.11) is an IP address of the electronic device A1, and the destination IP address (20.20.20.21) is an IP address of the service server B1. After the protection device 100 receives the data flow X1, the protection device 100 parses the data flow X1, and obtains the source IP address (10.10.10.11) and the destination IP address (20.20.20.21) in the data flow X1.

S102: Determine first device attribute information corresponding to the source IP address.

The first device attribute information includes a first device type and a first service type, the first device type is a device type of the first electronic device, and the first service type is a service type that can be accessed by the first device type.

In S102, the first device type corresponding to the source IP address may be first determined, and then the first service type corresponding to the first device type is determined.

There are many manners for "determining the first device type corresponding to the source IP address", and the following describes two manners.

In a first manner, the first device type corresponding to the source IP address is determined by using a third-party server. The third-party server may be a SHODAN server, a ZOOMEYE server, a FOFA server, or the like. The "device type" mentioned in this embodiment of this disclosure includes but is not limited to a bridge, a broadband router, a firewall, a hub, a load balancer, a router, a switch, a game console, a media device, a power device, a printer, a print server, a proxy server, a remote management server, a security miscellaneous server, a dedicated server, a storage miscellaneous server, a telecommunications miscellaneous server, a terminal server, a Voice over Internet Protocol (VoIP) adapter, a VoIP phone, a network camera, a phone, and a terminal. Optionally, the "device type" may further be classified into a plurality of levels of categories and subcategories. A two-level device type is used as an example. The device type is classified into three categories: a "gateway/network device category", a "standalone device category", and a "personal device category". The "gateway/network device category" further includes a bridge, a broadband router, a firewall, a hub, a load balancer, a router, and a switch. The "standalone device category" further includes a game console, a media device, a power device, a printer, a print server, a proxy server, a remote management server, a security miscellaneous server, a dedicated server, a storage miscellaneous server, a telecommunications miscellaneous server, a terminal server, a VoIP adapter, a VoIP phone, and a network camera. The "personal device category" includes a phone and a terminal.

Figure 3:
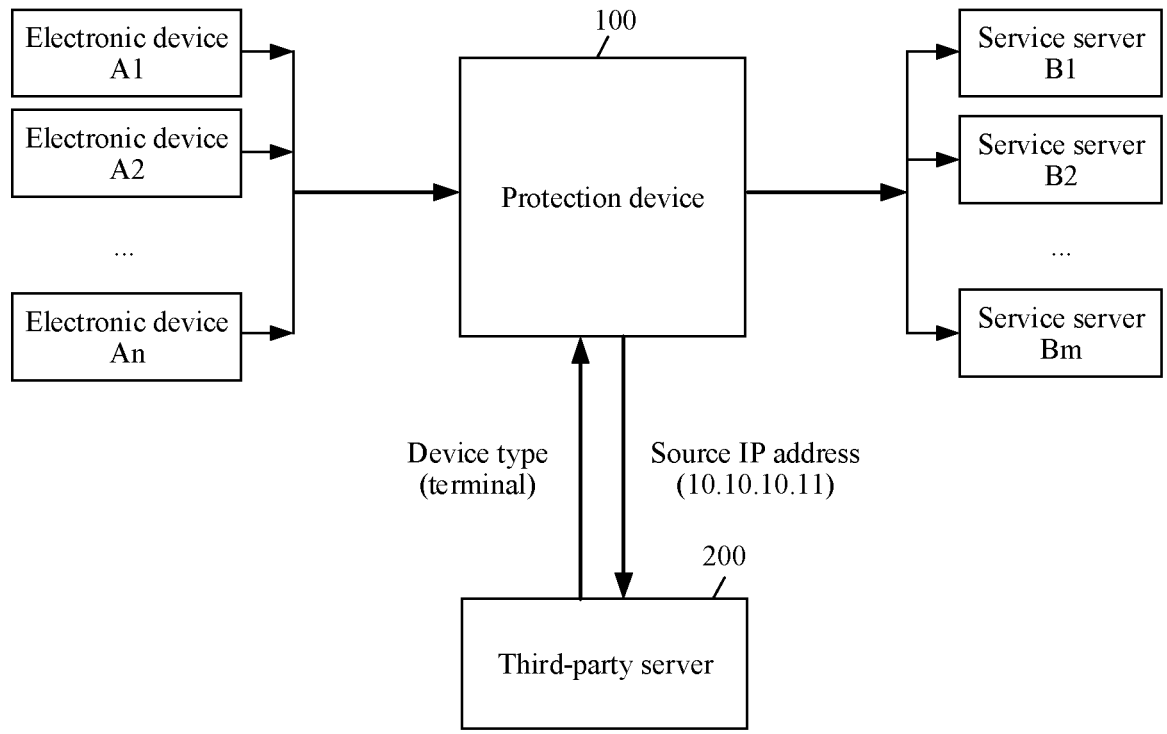
FIG. 3 is a schematic diagram of another scenario to which a network security protection method according to an embodiment of this disclosure is applicable.

For example, FIG. 3 is a schematic diagram of another scenario to which the network security protection method according to this embodiment of this disclosure is applicable. It is assumed that the protection device 100 sends a query request to a third-party server 200, where the query request includes the source IP address (10.10.10.11). After the third-party server 200 receives the query request, the third-party server 200 queries a device type (terminal) corresponding to the source IP address (10.10.10.11), and sends the device type (terminal) corresponding to the source IP address (10.10.10.11) to the protection device 100.

For example, the third-party server 200 is a SHODAN server. The SHODAN server provides services through an application programming interface (API) "https://api.shodan.io/". The protection device 100 invokes an API Uniform Resource Locator (URL): https://api.shodan.io/shodan/host/{ip}?key={YOUR_API_KEY} by using a request, where the IP address (10.10.10.11) is filled in {ip}. The protection device 100 receives JavaScript Object Notation (JSON) data returned by the SHODAN server, parses the JSON data to obtain a field device type that describes corresponding device type information, and obtains "terminal" from content of the field device type. In other words, the device type corresponding to the IP address (10.10.10.11) is the terminal.

In a second manner, the first device type corresponding to the source IP address is determined by using open-source scanning software. The open-source scanning software may be Network Mapper (NMAP), Mass IP Port Scanner (MASSCAN), IVRE, or the like.

Figure 4:
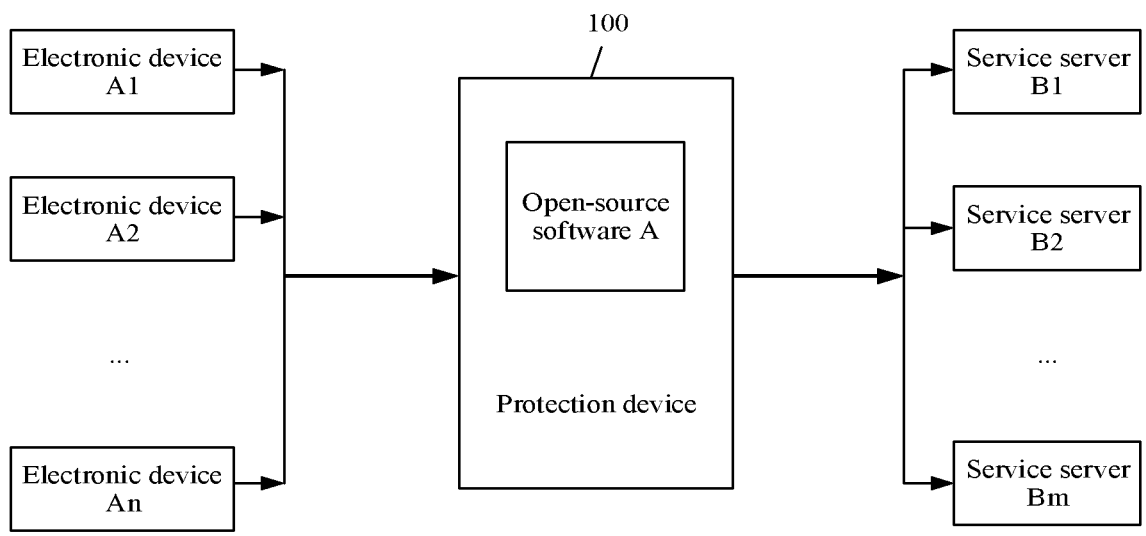
FIG. 4 is a schematic diagram of another scenario to which a network security protection method according to an embodiment of this disclosure is applicable.

For example, FIG. 4 is a schematic diagram of another scenario to which the network security protection method according to this embodiment of this disclosure is applicable. It is assumed that open-source scanning software A is pre-installed on the protection device 100. The protection device 100 may input the source IP address (10.10.10.11) to open-source scanning software A, and the open-source scanning software A outputs a device type (terminal) corresponding to the source IP address (10.10.10.11).

The open-source scanning software IVRE is used as an example. The protection device 100 instructs, by using a command "ivre runscans --network 10.10.10.11 --output=XMLFork", the IVRE to scan the IP address (10.10.10.11). The IVRE stores scanning result data in a MongoDB database. The scanning result data includes a field "service devicetype", and the device type corresponding to the IP address (10.10.10.11) is stored in the field. The protection device 100 queries the MongoDB database to obtain the device type corresponding to the IP address (10.10.10.11).

Optionally, for "determining the first service type corresponding to the first device type", a mapping relationship between a device type and a service type may be pre-established, and the mapping relationship between a device type and a service type is stored in the protection device. The protection device may determine, based on the mapping relationship between a device type and a service type, the first service type corresponding to the first device type.

For example, Table 1 is a table of the mapping relationship between a device type and a service type. It may be learned from Table 1 that each device type corresponds to at least one service type. Optionally, the service type includes but is not limited to website access, a terminal (mobile phone) game, video/audio instant messaging, Internet of things (IoT) control, an API service (for example, the SHODAN service mentioned above), and the like. For intuitiveness and ease of understanding, in this embodiment of this disclosure, a service type C1 to a service type C4, a service type D1 to a service type D3, and a service type E1 to a service type E5 are used to indicate different service types.

TABLE 1

| Device type | Service type |
| --- | --- |
| Terminal | Service type C1, service type C2, service type C3, and service type C4 |
| Phone | Service type D1, service type D2, and service type D3 |
| Router | Service type E1, service type E2, service type E3, service type E4, and service type E5 |
| . . . | . . . |

S103: Determine second device attribute information corresponding to the destination IP address.

The second device attribute information includes a second device type and a second service type, the second device type is a device type allowed to access the first server, and the second service type is a service type of a service provided by the first server.

In S103, the protection device may pre-establish a mapping relationship between a destination IP address, a device type allowed to access a service server, and a service type of the service server based on information provided by a plurality of service servers (B1, B2, . . . , Bm). Then, the device type and the service type that correspond to the destination IP address are determined based on the mapping relationship.

For example, Table 2 is a table of the mapping relationship between a destination IP address, a device type, and a service type.

TABLE 2

| Destination IP address | Device type | Service type |
| --- | --- | --- |
| 20.20.20.21 | Terminal, phone, and game console | Service type D1 |
| 20.20.20.22 | Router | Service type C1 |
| . . . | . . . | . . . |

For example, with reference to FIG. 1 and Table 2, it is assumed that the protection device 100 determines, based on Table 2, that a device type corresponding to the destination IP address (20.20.20.21) includes the terminal, the phone, and the game console, and a corresponding service type is the service type D1. The terminal, the telephone, and the game console are device types allowed to access the service server B1, and the service type D1 is a service type of a service provided by the server B1.

S104: Forward the first data flow when the first device attribute information matches the second device attribute information.

S105: Block the first data flow when the first device attribute information does not match the second device attribute information.

After the protection device obtains the first device attribute information and the second device attribute information, the protection device determines whether the first device attribute information matches the second device attribute information. If the first device attribute information matches the second device attribute information, it indicates that the first electronic device meets a requirement of the first server. Therefore, the first data flow is secure, and the protection device forwards the first data flow.

For example, with reference to FIG. 1, Table 1, and Table 2, it is assumed that the protection device 100 determines that the device type corresponding to the source IP address (10.10.10.11) is the terminal, and determines, by using Table 1, that service types corresponding to the device type being the terminal include the service type C1, the service type C2, the service type C3, and the service type C4. It indicates that a device type of the electronic device A1 is the terminal, and service types that can be accessed by the terminal include the service type C1, the service type C2, the service type C3, and the service type C4.

It is assumed that the protection device 100 determines, by using Table 2, that the device type corresponding to the destination IP address (20.20.20.21) includes the terminal, the phone, and the game console, and that the corresponding service type is the service type D1. It indicates that the device types allowed to access the service server B1 are the terminal, the phone, and the game console, and the service type of the service server B1 is the service type D1.

The protection device 100 determines that the device type (terminal) of the electronic device A1 matches the device type (terminal, phone, game console) allowed to access the service server B1, and determines the service types (the service type C1, the service type C2, the service type C3, and the service type C4) that can be accessed by the electronic device A1 do not match the service type (the service type D1) of the service server B1. Therefore, the protection device 100 blocks the data flow X1.

As mentioned above, the first device attribute information includes the first device type and the first service type, and the second device attribute information includes the second device type and the second service type. "The first device attribute information matching the second device attribute information" includes a plurality of cases, and the following separately describes the cases.

In a first case, the first device type is the same as the second device type, and the first service type is the same as the second service type.

For example, the first device type is a device type G1, the second device type is the device type G1, the first service type is a service type H1, and the second service type is the service type H1.

In a second case, the first device type is the same as the second device type, and the first service type includes the second service type.

For example, the first device type is a device type G1, the second device type is the device type G1, the first service type includes a service type H1 and a service type H2, and the second service type is the service type H1.

In a third case, the first device type is the same as the second device type, and the second service type includes the first service type.

For example, the first device type is a device type G1, the second device type is the device type G1, the second service type includes a service type H1 and a service type H2, and the first type is the service type H1.

In a fourth case, the first device type includes the second device type, and the first service type is the same as the second service type.

For example, the first device type includes a device type G1 and a device type G2, the second device type is the device type G1, the first service type is a service type H1, and the second service type is the service type H1.

In a fifth case, the first device type includes the second device type, and the first service type includes the second service type.

For example, the first device type includes a device type G1 and a device type G2, the second device type is the device type G1, the first service type includes a service type H1 and a service type H2, and the second service type is the service type H1.

In a sixth case, the first device type includes the second device type, and the second service type includes the first service type.

For example, the first device type includes a device type G1 and a device type G2, the second device type is the device type G1, the second service type includes a service type H1 and a service type H2, and the first service type is the service type H1.

In a seventh case, the second device type includes the first device type, and the first service type is the same as the second service type.

For example, the second device type includes a device type G1 and a device type G2, the first device type is the device type G1, the first service type is a service type H1, and the second service type is the service type H1.

In an eighth case, the second device type includes the first device type, and the first service type includes the second service type.

For example, the second device type includes a device type G1 and a device type G2, the first device type is the device type G1, the first service type includes a service type H1 and a service type H2, and the second service type is the service type H1.

In a ninth case, the second device type includes the first device type, and the second service type includes the first service type.

For example, the second device type includes a device type G1 and a device type G2, the first device type is the device type G1, the second service type includes a service type H1 and a service type H2, and the first service type is the service type H1.

The first case, the third case, the seventh case, and the ninth case may be understood as that the first device type is a subset of the second device type, and the first service type is a subset of the second service type.

The first case, the second case, the fourth case, and the fifth case may be understood as that the second device type is a subset of the first device type, and the second service type is a subset of the first service type.

The first case, the second case, the seventh case, and the eighth case may be understood as that the first device type is a subset of the second device type, and the second service type is a subset of the first service type.

The first case, the third case, the fourth case, and the sixth case may be understood as that the second device type is a subset of the first device type, and the first service type is a subset of the second service type.

In the embodiment shown in FIG. 2, according to the network security protection method provided in this embodiment of this disclosure, the source IP address and the destination IP address in the first data flow are obtained. Then, the first device attribute information corresponding to the source IP address and the second device attribute information corresponding to the destination IP address are determined. Finally, it is determined, based on whether the first device attribute information matches the second device attribute information, to forward or block the first data flow. A core of this embodiment of this disclosure is to determine whether the device type of the first electronic device matches the device type allowed to access the first server, and determine whether the service type that can be accessed by the first device type matches the service type of the first server. If the device types match and the service types match, it indicates that the first electronic device meets the requirement of the first server. In other words, the first data flow is secure, or the first data flow is a non-offensive data flow. Therefore, the first data flow is forwarded. If the device types do not match or the service types do not match, it indicates that the first electronic device does not meet the requirement of the first server. In other words, the first data flow is insecure, or the first data flow is an offensive data flow. Therefore, the first data flow needs to be blocked. Therefore, according to the solution provided in this embodiment of this disclosure, whether a data flow sent by an electronic device is offensive can be accurately identified, and an offensive data flow can be blocked, so that a secure data flow enters a service server. Therefore, protection accuracy of the solution provided in this embodiment of this disclosure is relatively high.

Figure 5:
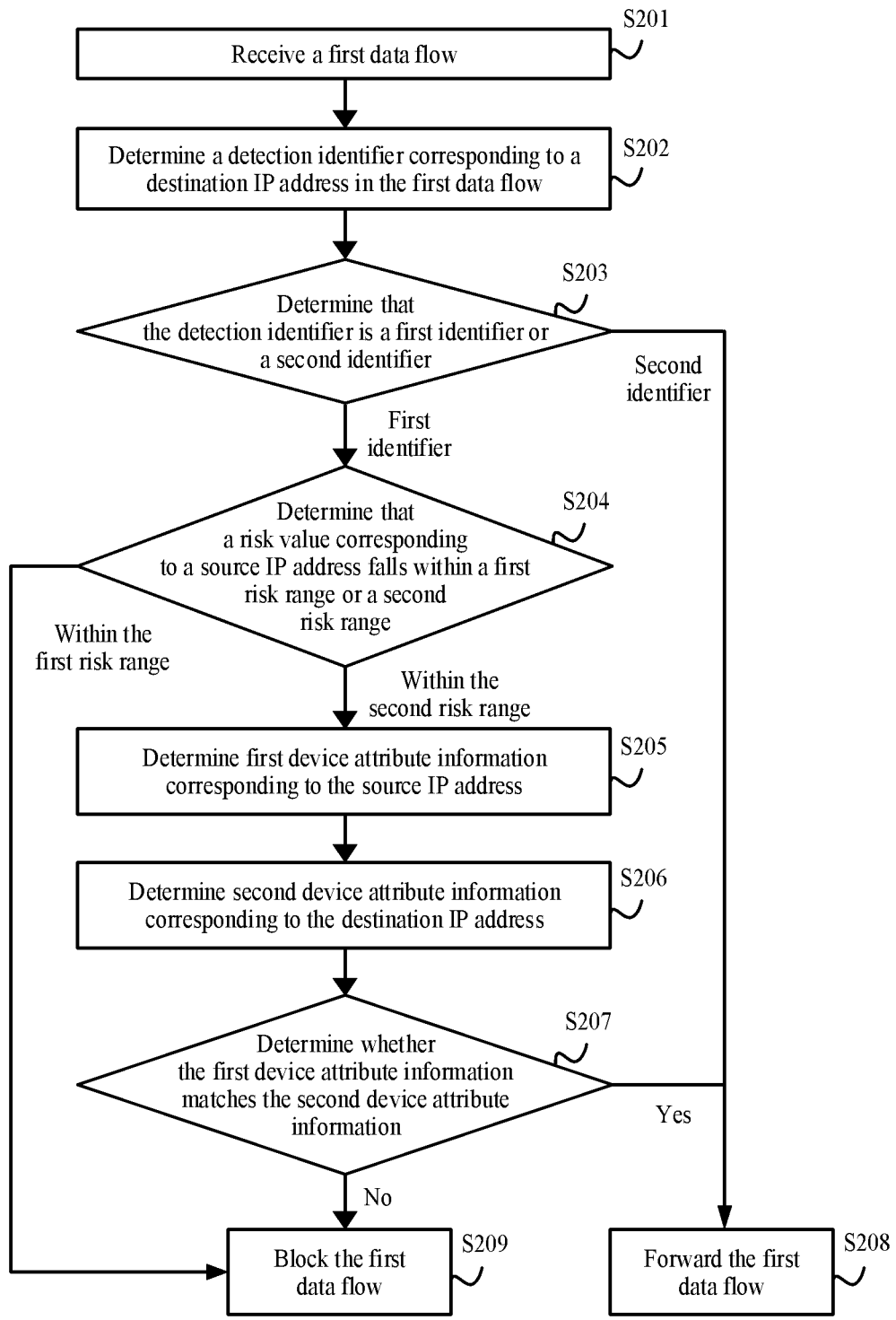
FIG. 5 is a flowchart of another network security protection method according to an embodiment of this disclosure.

FIG. 5 is a flowchart of another network security protection method according to an embodiment of this disclosure. The method shown in FIG. 5 may include steps S201 to S209. Optionally, the network security protection method shown in FIG. 5 is performed by the protection device 100 in FIG. 1.

S201: Receive a first data flow.

For specific implementation of S201, refer to the description of S101 in the embodiment shown in FIG. 2.

S202: Determine a detection identifier corresponding to a destination IP address in the first data flow.

The detection identifier is a first identifier or a second identifier, the first identifier is used to indicate that a first server is currently attacked, and the second identifier is used to indicate that the first server is not currently attacked.

For example, with reference to FIG. 1, the protection device 100 monitors running statuses of the plurality of service servers (B1, B2, . . . , Bm). The protection device 100 may monitor a resource usage of each of the plurality of service servers (B1, B2, . . . , Bm), for example, a central processing unit (CPU) usage, a memory usage, and a bandwidth usage. It is assumed that, when the service server B1 is not attacked by a hacker, the resource usage of the service server B1 ranges from 20% to 50%, and the service server B1 sends an IP address (20.20.20.21) and the second identifier to the protection device 100. It is assumed that when the service server B1 is attacked by a hacker, the resource usage of the service server B1 ranges from 60% to 80%, and the service server B1 sends an IP address (20.20.20.21) and the first identifier to the protection device 100.

The protection device 100 may further monitor a quantity of IP addresses that access each of the plurality of service servers (B1, B2, . . . , Bm) at the same time, namely, a quantity of different IP addresses that access each server at the same time. It is assumed that, when the service server B1 is not attacked by the hacker, the quantity of IP addresses that access the service server B1 at the same time ranges from 100,000 to 200,000, and the service server B1 sends the IP address (20.20.20.21) and the second identifier to the protection device 100. It is assumed that when the service server B1 is attacked by the hacker, the quantity of IP addresses that access the service server B1 at the same time ranges from 300,000 to 400,000, and the service server B1 sends the IP address (20.20.20.21) and the first identifier to the protection device 100.

The plurality of service servers (B1, B2, . . . , Bm) may periodically send IP addresses that access the plurality of service servers (B1, B2, . . . , Bm) and detection identifiers to the protection device 100, and the protection device 100 may store the IP address and the detection identifier sent by each of the plurality of service servers (B1, B2, . . . , Bm).

For example, Table 3 is a table of a mapping relationship between a destination IP address and a detection identifier. It is assumed that the first row of data shown in Table 3 is data sent by the service server B1 to the protection device 100. In other words, it indicates that the service server B1 is currently attacked. It is assumed that the second row of data shown in Table 3 is data sent by the service server B2 to the protection device 100. In other words, it indicates that the service server B2 is not currently attacked.

TABLE 3

| IP address | Detection identifier |
| --- | --- |
| 20.20.20.21 | First identifier |
| 20.20.20.22 | Second identifier |
| . . . | . . . |

Optionally, the protection device 100 determines, in another manner, whether each of the plurality of service servers (B1, B2, . . . , Bm) is attacked. For example, the protection device 100 sends a test packet to each service server, and receives a corresponding response packet. The protection device 100 calculates a time difference between time at which the test packet is sent and time at which the response packet is received, and determines, based on a comparison result between the time difference and a predetermined delay threshold, whether the service server is attacked. For example, the protection device 100 sends the test packet to the service server B1, and receives a corresponding response packet returned by the server B1. The protection device 100 obtains through calculation that a time difference between time at which the test packet is sent and time at which the response packet is received is 0.05 seconds. The predetermined delay threshold is 0.8 s. Because the time difference in this case is less than the predetermined delay threshold, the protection device 100 determines that the server B1 is not currently attacked, and further determines that the server B1 corresponds to the second identifier. For another example, the protection device 100 sends the test packet to the service server B2, and receives a corresponding response packet returned by the server B2. The protection device 100 obtains through calculation that a time difference between time at which the test packet is sent and time at which the response packet is received is 1 s. Because the time difference in this case is greater than the predetermined delay threshold, the protection device 100 determines that the server B2 is currently attacked, and further determines that the server B2 corresponds to the first identifier.

In addition to the foregoing two listed manners in which the protection device 100 determines whether the server is being attacked, the protection device 100 may alternatively use other determining manners, which are not listed herein one by one.

S203: Determine that the detection identifier corresponding to the destination IP address is the first identifier or the second identifier, and perform S204 when the detection identifier corresponding to the destination IP address is the first identifier, or perform S208 when the detection identifier corresponding to the destination IP address is the second identifier.

In the embodiment shown in FIG. 5, S202 and S203 are optional steps. In S202 and S203, when the detection identifier corresponding to the destination IP address is the first identifier, it indicates that the first server is currently attacked. Therefore, a risk value corresponding to a source IP address needs to be determined. When the detection identifier corresponding to the destination IP address is the second identifier, it indicates that the first server is not currently attacked. Therefore, whether the first data flow is an offensive data flow does not need to be detected, the first data flow may be directly forwarded, and a step of detecting whether the first data flow is an offensive data flow is omitted. In this way, processing resources of the protection device are reduced, a transmission delay caused by detecting whether the first data flow is an offensive data flow is reduced, and service response timeliness is improved.

S204: Determine that the risk value corresponding to the source IP address falls within a first risk range or a second risk range, and perform S209 if the risk value corresponding to the source IP address falls within the first risk range, or perform S205 if the risk value corresponding to the source IP address falls within the second risk range.

Risks indicated by risk values in the first risk range are all higher than risks indicated by risk values in the second risk range. There are two relationships between the first risk range and the second risk range. A first relationship is that a minimum value in the first risk range is greater than a maximum value in the second risk range, and the second relationship is that a minimum value in the second risk range is greater than a maximum value in the first risk range.

When the minimum value in the first risk range is greater than the maximum value in the second risk range, for example, it is assumed that a larger risk value indicates a higher risk, and a smaller risk value indicates a lower risk. In this case, the risk value in the first risk range may be set to an integer ranging from 6 to 10, and the risk value in the second risk range may be set to an integer ranging from 1 and 5. A minimum value "6" in the first risk range is greater than a maximum value "5" in the second risk range, and risks indicated by the risk values (integers ranging from 6 to 10) in the first risk range are all higher than risks indicated by the risk values (integers ranging from 1 to 5) in the second risk range.

When the minimum value in the second risk range is greater than the maximum value in the first risk range, for example, it is assumed that a larger risk value indicates a lower risk, and a smaller risk value indicates a higher risk. In this case, the risk value in the first risk range may be set to an integer ranging from 1 to 5, and the risk value in the second risk range may be set to an integer ranging from 6 and 10. A minimum value "6" in the second risk range is greater than a maximum value "5" in the first risk range, and risks indicated by the risk values (integers ranging from 1 to 5) in the first risk range are all higher than risks indicated by the risk values (integers ranging from 6 to 10) in the second risk range.

The risk value corresponding to the source IP address is determined based on an attack on a service server by the IP address within a historical time period.

For example, it is assumed that a larger risk value indicates a higher risk, and a smaller risk value indicates a lower risk. If a source IP address A frequently attacks a service server within a historical time period, a risk value of the source IP address A may be increased. For another example, if a source IP address A less frequently attacks a service server within a historical time period, a risk value of the IP address A may be reduced. For another example, if a source IP address A does not attack a service server within a historical time period, a risk value of the IP address A may be set to a minimum value.

For another example, it is assumed that a larger risk value indicates a lower risk, and a smaller risk value indicates a higher risk. If a source IP address A frequently attacks a service server within a historical time period, a risk value of the source IP address A may be reduced. For another example, if a source IP address A less frequently attacks a service server within a historical time period, a risk value of the IP address A may be increased. For another example, if a source IP address A does not attack a service server within a historical time period, a risk value of the IP address A may be set to a maximum value.

If the risk value corresponding to the source IP address falls within the first risk range, it indicates that the source IP address is more likely to attack the first server. In other words, the first data flow is a relatively dangerous data flow. In this case, the protection device blocks the first data flow. If the risk value corresponding to the source IP address falls within the second risk range, it indicates that the source IP address is less likely to attack the first server. In other words, the first data flow is not a relatively dangerous data flow, but the first data flow cannot be considered secure. Therefore, the protection device continues to detect whether the first data flow is offensive.

In the embodiment shown in FIG. 5, S204 is an optional step. In S204, when the risk value corresponding to the source IP address falls within the first risk range, it indicates that the source IP address is more likely to attack the first server. Therefore, the protection device blocks the first data flow, to prevent the first server from being attacked by the first data flow. When the risk value corresponding to the source IP address falls within the second risk range, it indicates that the source IP address is less likely to attack the first server, but the first data flow cannot be considered secure. Therefore, the protection device continues to detect whether the first data flow is offensive. If it is determined that the first data flow is offensive, the first data flow may be blocked, to prevent the first server from being attacked by the first data flow.

S205: Determine first device attribute information corresponding to the source IP address.

For specific implementation of S205, refer to the description of S102 in the embodiment shown in FIG. 2.

S206: Determine second device attribute information corresponding to the destination IP address.

For specific implementation of S206, refer to the description of S103 in the embodiment shown in FIG. 2.

S207: Determine whether the first device attribute information matches the second device attribute information, and if the first device attribute information matches the second device attribute information, perform S208, otherwise, if the first device attribute information does not match the second device attribute information, perform S209.

S208: Forward the first data flow.

S209: Block the first data flow.

Optionally, for specific implementation of S207 to S209, refer to the descriptions of S104 and S105 in the embodiment shown in FIG. 2.

Figure 6:
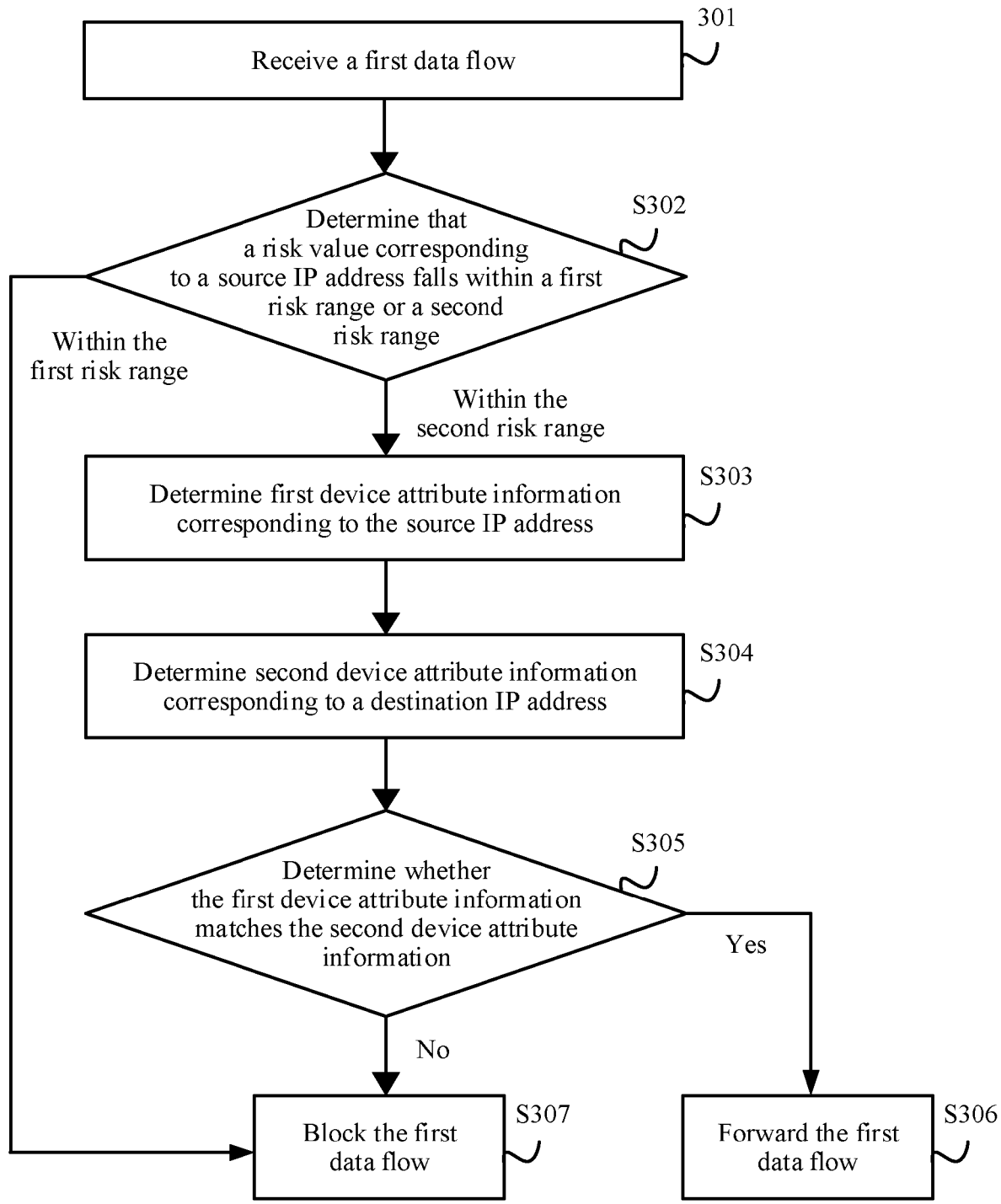
FIG. 6 is a flowchart of another network security protection method according to an embodiment of this disclosure.

FIG. 6 is a flowchart of another network security protection method according to an embodiment of this disclosure. The method shown in FIG. 6 may include steps S301 to S307. Optionally, the network security protection method shown in FIG. 6 is performed by the protection device 100 in FIG. 1.

S301: Receive a first data flow.

For specific implementation of S301, refer to the description of S101 in the embodiment shown in FIG. 2.

S302: Determine that a risk value corresponding to a source IP address falls within a first risk range or a second risk range, and perform S307 if the risk value corresponding to the source IP address falls within the first risk range, or perform S303 if the risk value corresponding to the source IP address falls within the second risk range.

For specific implementation of S302, refer to the description of S204 in the embodiment shown in FIG. 5.

In the embodiment shown in FIG. 6, S302 is an optional step. In S302, when the risk value corresponding to the source IP address falls within the first risk range, it indicates that the source IP address is more likely to attack a first server. Therefore, the protection device directly blocks the first data flow, and omits detecting whether the first data flow is offensive, to improve timeliness of preventing an attack. When the risk value corresponding to the source IP address falls within the second risk range, it indicates that the source IP address is less likely to attack a first server, but the first data flow cannot be considered secure. Therefore, the protection device continues to detect whether the first data flow is offensive. If it is determined that the first data flow is offensive, the first data flow may be blocked, to prevent the first server from being attacked by the first data flow.

S303: Determine first device attribute information corresponding to the source IP address.

For specific implementation of S303, refer to the description of S102 in the embodiment shown in FIG. 2.

S304: Determine second device attribute information corresponding to the destination IP address.

For specific implementation of S304, refer to the description of S103 in the embodiment shown in FIG. 2.

S305: Determine whether the first device attribute information matches the second device attribute information, and if the first device attribute information matches the second device attribute information, perform S306, otherwise, if the first device attribute information does not match the second device attribute information, perform S307.

S306: Forward the first data flow.

S307: Block the first data flow.

Optionally, for specific implementation of S305 to S307, refer to the descriptions of S104 and S105 in the embodiment shown in FIG. 2.

Figure 7:
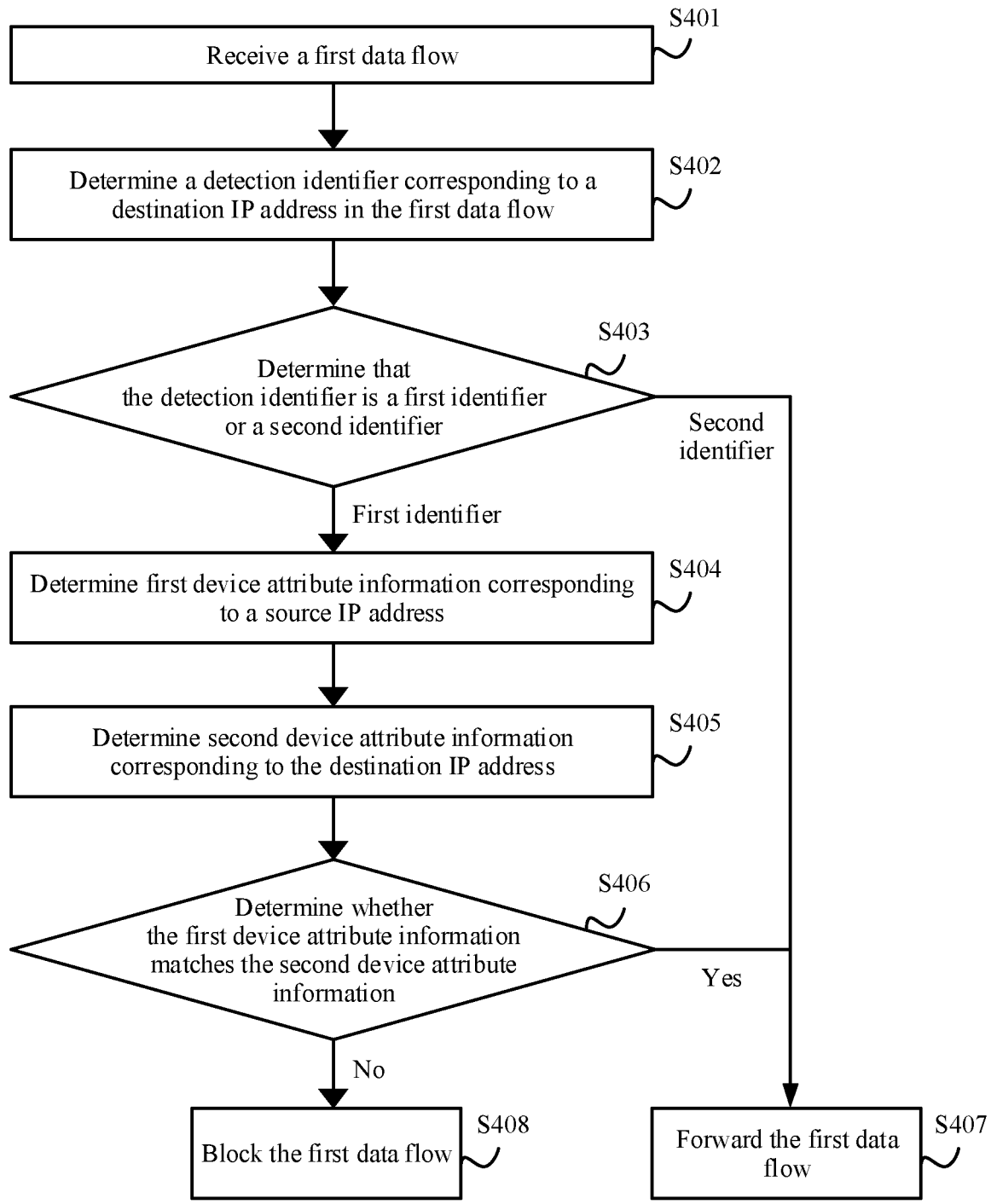
FIG. 7 is a flowchart of another network security protection method according to an embodiment of this disclosure.

FIG. 7 is a flowchart of another network security protection method according to an embodiment of this disclosure. The method shown in FIG. 7 may include steps S401 to S408. Optionally, the network security protection method shown in FIG. 7 is performed by the protection device 100 in FIG. 1.

S401: Receive a first data flow.

For specific implementation of S401, refer to the description of S101 in the embodiment shown in FIG. 2.

S402: Determine a detection identifier corresponding to a destination IP address in the first data flow.

For specific implementation of S402, refer to the description of S202 in the embodiment shown in FIG. 5.

S403: Determine that the detection identifier corresponding to the destination IP address is a first identifier or a second identifier, and perform S404 when the detection identifier corresponding to the destination IP address is the first identifier, or perform S407 when the detection identifier corresponding to the destination IP address is the second identifier.

For specific implementation of S403, refer to the description of S203 in the embodiment shown in FIG. 5.

In the embodiment shown in FIG. 7, S403 is an optional step. In S403, when the detection identifier corresponding to the destination IP address is the first identifier, it indicates that a first server is currently attacked. Therefore, whether the first data flow is an offensive data flow needs to be detected. If it is determined that the first data flow is offensive, the first data flow may be blocked, to prevent the first server from being attacked by the first data flow. When the detection identifier corresponding to the destination IP address is the second identifier, it indicates that a first server is not currently attacked. Therefore, whether the first data flow is an offensive data flow does not need to be detected, the first data flow may be directly forwarded, and a step of detecting whether the first data flow is an offensive data flow is omitted. In this way, processing resources of the protection device are reduced, a transmission delay caused by detecting whether the first data flow is an offensive data flow is reduced, and service response timeliness is improved.

S404: Determine first device attribute information corresponding to a source IP address.

For specific implementation of S404, refer to the description of S102 in the embodiment shown in FIG. 2.

S405: Determine second device attribute information corresponding to the destination IP address.

For specific implementation of S405, refer to the description of S103 in the embodiment shown in FIG. 2.

S406: Determine whether the first device attribute information matches the second device attribute information, and if the first device attribute information matches the second device attribute information, perform S407, otherwise, if the first device attribute information does not match the second device attribute information, perform S408.

S407: Forward the first data flow.

S408: Block the first data flow.

Optionally, for specific implementation of S406 to S408, refer to the descriptions of S104 and S105 in the embodiment shown in FIG. 2.

Figure 8:
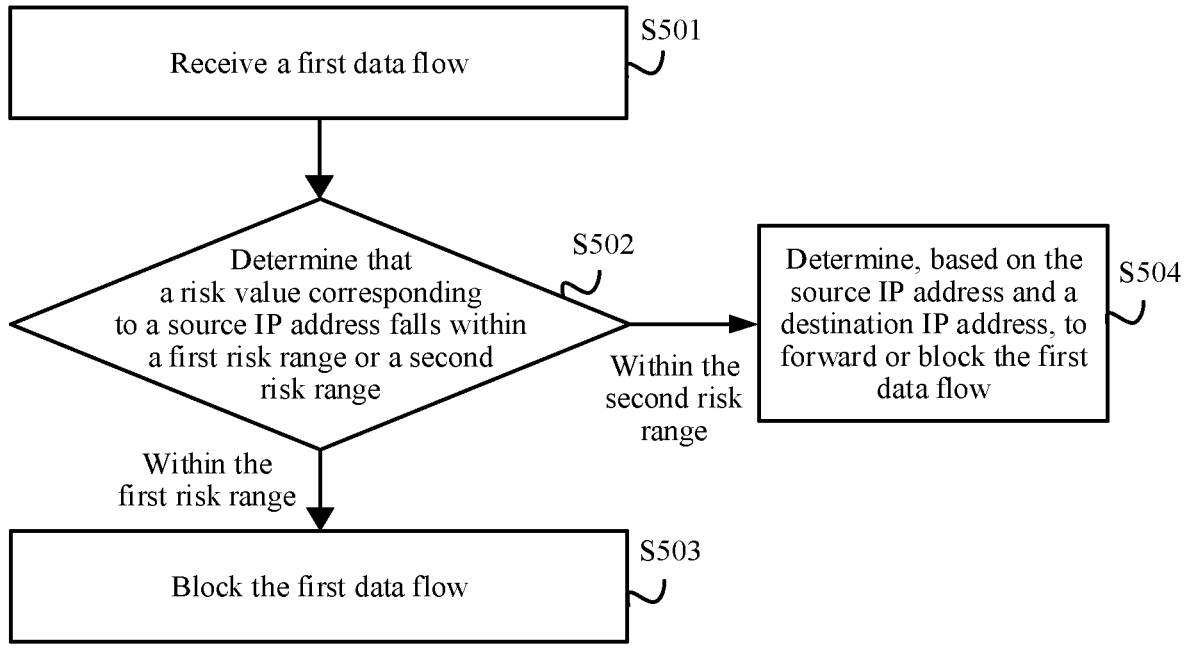
FIG. 8 is a flowchart of another network security protection method according to an embodiment of this disclosure.

FIG. 8 is a flowchart of another network security protection method according to an embodiment of this disclosure. The method shown in FIG. 8 may include steps S501 to S504. Optionally, the network security protection method shown in FIG. 8 is performed by the protection device 100 in FIG. 1.

S501: Receive a first data flow.

For specific implementation of S501, refer to the description of S101 in the embodiment shown in FIG. 2.

S502: Determine that a risk value corresponding to a source IP address falls within a first risk range or a second risk range, and perform S503 if the risk value corresponding to the source IP address falls within the first risk range, or perform S504 if the risk value corresponding to the source IP address falls within the second risk range.

For specific implementation of S502, refer to the description of S204 in the embodiment shown in FIG. 5.

In the embodiment shown in FIG. 8, S502 is an optional step. In S502, when the risk value corresponding to the source IP address falls within the first risk range, it indicates that the source IP address is more likely to attack a first server. Therefore, the protection device blocks the first data flow, to prevent the first server from being attacked by the first data flow. When the risk value corresponding to the source IP address falls within the second risk range, it indicates that the source IP address is less likely to attack a first server, but the first data flow cannot be considered secure. Therefore, the protection device continues to detect whether the first data flow is offensive. If it is determined that the first data flow is offensive, the first data flow may be blocked, to prevent the first server from being attacked by the first data flow.

S503: Block the first data flow.

S504: Determine, based on the source IP address and a destination IP address, to forward or block the first data flow.

Optionally, because S504 includes S402 to S408 shown in FIG. 7, for specific implementation of S504, refer to S402 to S408 shown in FIG. 7.

Figure 9:
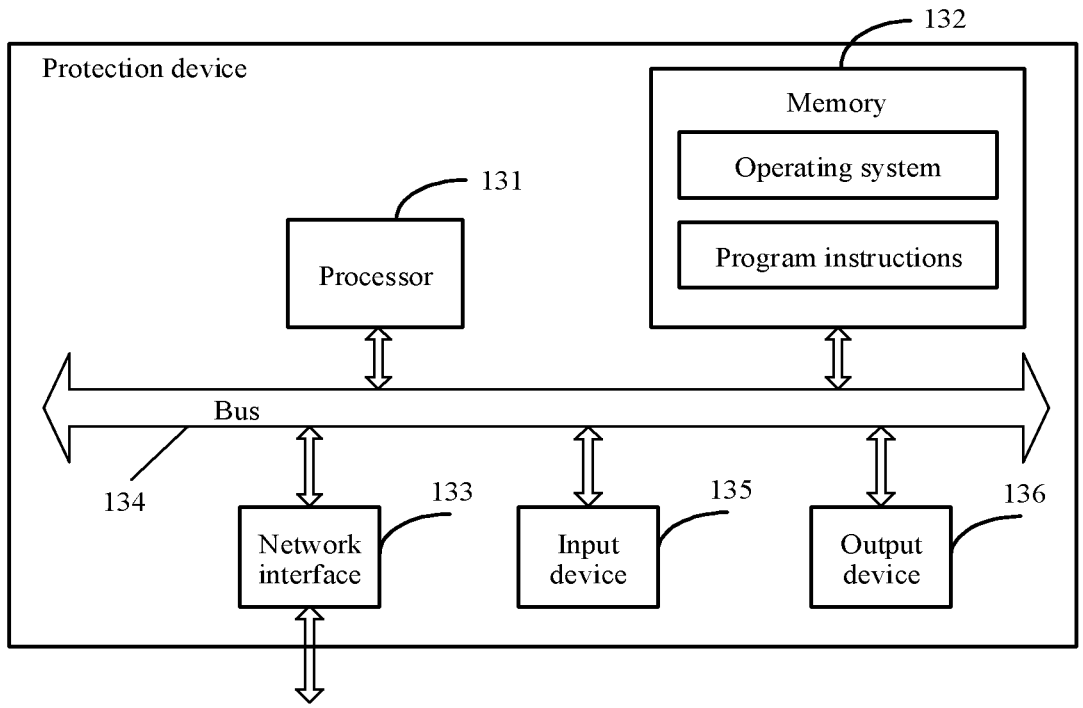
FIG. 9 is a schematic diagram of a structure of a protection device according to an embodiment of this disclosure.

Correspondingly, an embodiment of this disclosure provides a protection device, configured to perform the network security protection method provided in the foregoing embodiments. FIG. 9 is a schematic diagram of a structure of a protection device according to an embodiment of this disclosure. Optionally, the protection device shown in FIG. 9 is the protection device 100 in the disclosure scenarios shown in FIG. 1, FIG. 3, and FIG. 4. The protection device includes a processor 131, a memory 132, and a network interface 133.

The processor 131 may be one or more CPUs, and the CPU may be a single-core CPU or a multi-core CPU.

The memory 132 includes but is not limited to a random-access memory (RAM), a read-only memory (ROM), an erasable programmable read-only memory (EPROM), a flash memory, an optical memory, or the like. The memory 132 stores code of an operating system.

The network interface 133 may be a wired interface, for example, a Fiber Distributed Data Interface (FDDI), a Gigabit Ethernet (GE) interface. Alternatively, the network interface 133 may be a wireless interface. The network interface 133 is configured to: receive a data flow from an internal network and/or an external network, and communicate with a switch in the internal network according to an indication of the processor 131.

Optionally, the processor 131 implements the method in the foregoing embodiments by reading instructions stored in the memory 132, or the processor 131 may implement the method in the foregoing embodiments by executing instructions stored inside. When the processor 131 implements the method in the foregoing embodiments by reading the instructions stored in the memory 132, the memory 132 stores the instructions for implementing the method provided in the foregoing embodiments of this disclosure.

The network interface 133 is configured to receive a first data flow. The first data flow includes a source IP address and a destination IP address, the source IP address is an IP address of a first electronic device, and the destination IP address is an IP address of a first server.

After the processor 131 executes the instructions stored in the memory 132, the protection device is enabled to perform the following operations: determining first device attribute information corresponding to the source IP address, where the first device attribute information includes a first device type and a first service type, the first device type is a device type of the first electronic device, and the first service type is a service type that can be accessed by the first device type; determining second device attribute information corresponding to the destination IP address, where the second device attribute information includes a second device type and a second service type, the second device type is a device type allowed to access the first server, and the second service type is a service type of a service provided by the first server; and indicating the network interface 133 to forward the first data flow when the first device attribute information matches the second device attribute information, or blocking the first data flow when the first device attribute information does not match the second device attribute information.

The at least one processor 131 further performs the network security protection method described in the foregoing method embodiments based on several correspondence tables (for example, the tables 1 to 3 in the foregoing embodiments) stored in the memory 132. For more details of implementing the foregoing functions by the processor 131, refer to the descriptions in the foregoing method embodiments. Details are not described herein again.

Optionally, the protection device further includes a bus 134. The processor 131 and the memory 132 are connected to each other through the bus 134, or may be connected to each other in another manner.

Optionally, the protection device further includes an input device 135 and an output device 136. The input device 135 is configured to input data to the protection device, and the output device 136 is configured to output a processing result of the protection device.

The input device 135 includes but is not limited to a keyboard, a touchscreen, a microphone, and the like. The output device 136 includes but is not limited to a display, a printer, and the like.

Figure 10:
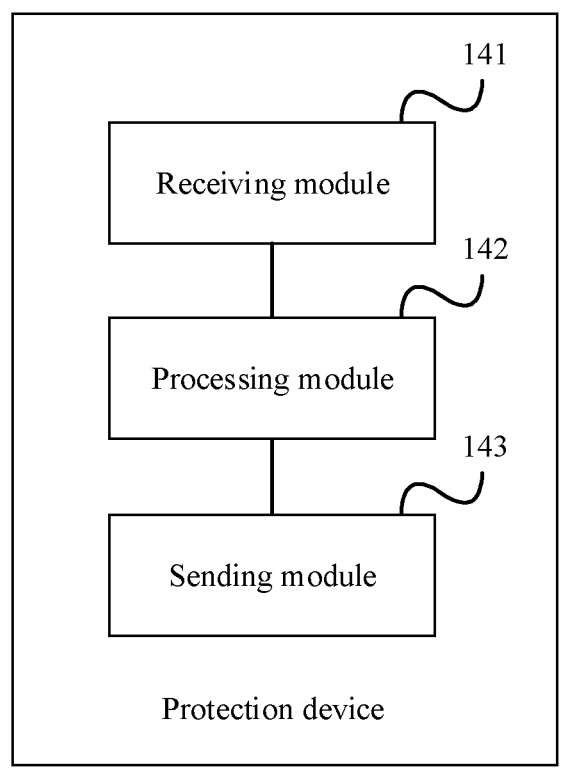
FIG. 10 is a schematic diagram of a structure of another protection device according to an embodiment of this disclosure.

FIG. 10 is a schematic diagram of a structure of another protection device according to an embodiment of this disclosure. The protection device includes a receiving module 141, a processing module 142, and a sending module 143. The protection device shown in FIG. 10 is used in the scenario shown in FIG. 1, to implement a function of the protection device 100 in the scenario.

The receiving module 141 receives a first data flow. The first data flow includes a source IP address and a destination IP address, the source IP address is an IP address of a first electronic device, and the destination IP address is an IP address of a first server.

The processing module 142 is configured to: determine first device attribute information corresponding to the source IP address, where the first device attribute information includes a first device type and a first service type, the first device type is a device type of the first electronic device, and the first service type is a service type that can be accessed by the first device type; determine second device attribute information corresponding to the destination IP address, where the second device attribute information includes a second device type and a second service type, the second device type is a device type allowed to access the first server, and the second service type is a service type of a service provided by the first server; and when the first device attribute information matches the second device attribute information, indicate the sending module 143 to forward the first data flow, or block the first data flow when the first device attribute information does not match the second device attribute information.

For additional functions that can be implemented by the receiving module 141 and the processing module 142, and for more details about implementing the foregoing functions, refer to descriptions in the foregoing method embodiments. Details are not repeated herein.

The apparatus embodiment described in FIG. 10 is merely an example. For example, the module division is merely logical function division and may be other division during actual implementation. For example, a plurality of modules or components may be combined or integrated into another system, or some features may be ignored or not performed. Function modules in embodiments of this disclosure may be integrated into one processing module, or each of the modules may exist alone physically, or two or more modules are integrated into one module. The foregoing modules in FIG. 10 may be implemented in a form of hardware, or may be implemented in a form of a software function unit. For example, when software is used for implementation, the receiving module 141 and the processing module 142 may be implemented by a software function module generated after the processor 131 in FIG. 9 reads program instructions stored in the memory. The foregoing modules in FIG. 10 may alternatively be separately implemented by different hardware in a network device. For example, the receiving module 141 is implemented by the network interface 133 in FIG. 9, and the processing module 142 is implemented by using some processing resources (for example, another core in the multi-core CPU) in the processor 131 in FIG. 9, or by using a programmable component, for example, a field-programmable gate array (FPGA) or a coprocessor. It is clear that the foregoing function modules may alternatively be implemented in a manner of combining software and hardware. For example, the receiving module 141 is implemented by the network interface 133, and the processing module 142 is a software function module generated after a CPU reads instructions stored in a memory.

For another additional function that can be implemented by the apparatus in FIG. 10, a process of interaction between the apparatus and another network element device, a technical effect that can be implemented by the apparatus, and more details of implementing the foregoing functions by the receiving module 141 and the processing module 142, refer to descriptions of the network device in the foregoing method embodiments. Details are not described herein again.

The embodiments in this specification are all described in a progressive manner. For same or similar parts in the embodiments, refer to these embodiments. Each embodiment focuses on a difference from other embodiments. Especially, a system embodiment is basically similar to a method embodiment, and therefore is described briefly. For related parts, refer to some descriptions in the method embodiment.

A person of ordinary skill in the art may understand that, when the various aspects or possible implementations of the various aspects in the embodiments of this disclosure are implemented by using software, all or some of the foregoing various aspects or the possible implementations of the various aspects may be implemented in a form of a computer program product. The computer program product is computer-readable instructions stored in a computer-readable medium. When the computer instructions are loaded and executed on a computer, the procedures or functions according to the embodiments of this disclosure are all or partially generated.

The computer-readable medium may be a computer-readable signal medium or a computer-readable storage medium. The computer-readable storage medium includes but is not limited to an electronic, magnetic, optical, electromagnetic, infrared, or semiconductor system, a device, an apparatus, or any suitable combination thereof. For example, the computer-readable storage medium is a RAM, a ROM, an EPROM, or a compact disc read-only memory (CD-ROM).

It is clear that a person skilled in the art can make various modifications and variations to the present disclosure without departing from the scope of the present disclosure. This disclosure is intended to cover these modifications and variations provided that they fall within the scope of protection defined by the following claims.

What is claimed is:

1. A network security protection method, comprising:
   receiving a first data flow, wherein the first data flow comprises a source Internet Protocol (IP) address and a destination IP address, wherein the source IP address is of a first electronic device, and wherein the destination IP address is of a first server;
   forwarding the first data flow when first device attribute information corresponding to the source IP address matches second device attribute information corresponding to the destination IP address, wherein the first device attribute information comprises a first device type and a first service type, wherein the first device type is of the first electronic device, wherein the first service type identifies services that are accessible to devices identified by the first device type, wherein the second device attribute information comprises a second device type and a second service type, wherein the second device type identifies devices that are allowed to access the first server, wherein the second service type is of a service from the first server, and wherein the first device attribute information matches the second device attribute information based on a comparison of the first device type of the first electronic device to the devices identified by the second device type and a comparison of the services identified by the first service type to the service from the first server; and
   blocking the first data flow when the first device attribute information does not match the second device attribute information.

2. The network security protection method of claim 1, further comprising:
   determining a detection identifier corresponding to the destination IP address in the first data flow, wherein the detection identifier is a first identifier or a second identifier, wherein the first identifier indicates that the first server is currently attacked, and wherein the second identifier indicates that the first server is not currently attacked;
   determining a risk value corresponding to the source IP address and blocking the first data flow when the detection identifier is the first identifier and when the risk value corresponding to the source IP address falls within a first risk range;
   determining the first device attribute information corresponding to the source IP address when the risk value falls within a second risk range, wherein either a minimum value in the first risk range is greater than a maximum value in the second risk range, or a minimum value in the second risk range is greater than a maximum value in the first risk range, and wherein first risks indicated by first risk values in the first risk range are all higher than second risks indicated by second risk values in the second risk range; and
   forwarding the first data flow when the detection identifier is the second identifier.

3. The network security protection method of claim 1, further comprising:
   determining a risk value corresponding to the source IP address;
   blocking the first data flow when the risk value falls within a first risk range; and
   determining the first device attribute information when the risk value falls within a second risk range,
   wherein either a minimum value in the first risk range is greater than a maximum value in the second risk range, or a minimum value in the second risk range is greater than a maximum value in the first risk range, and
   wherein first risks indicated by first risk values in the first risk range are all higher than second risks indicated by second risk values in the second risk range.

4. The network security protection method of claim 1, further comprising:
   determining a detection identifier corresponding to the destination IP address in the first data flow, wherein the detection identifier is a first identifier or a second identifier, wherein the first identifier indicates that the first server is currently attacked, and wherein the second identifier indicates that the first server is not currently attacked;
   determining the first device attribute information when the detection identifier is the first identifier; and
   forwarding the first data flow when the detection identifier is the second identifier.

5. The network security protection method of claim 1, further comprising:
   determining the first device type using a third-party server; and
   determining the first service type corresponding to the first device type.

6. The network security protection method of claim 5, further comprising:
   invoking an application programming interface (API) Uniform Resource Locator (URL) from the third-party server by using a request, wherein an IP field in the request is filled with the source IP address;
   receiving data from the third-party server;
   parsing the data to produce parsed data; and
   obtaining the first device type from the parsed data.

7. The network security protection method of claim 1, further comprising:
   determining the first device type using open-source scanning software; and
   determining the first service type corresponding to the first device type.

8. The network security protection method of claim 1, wherein the first device type comprises a gateway/network device type, a standalone device type, or a personal device type.

9. The network security protection method of claim 1, wherein the first service type comprises a website access type, a game type, an instant messaging type, or an application programming interface (API) service type.

10. A network security protection method, comprising:
    receiving a first data flow, wherein the first data flow comprises a source Internet Protocol (IP) address and a destination IP address, wherein the source IP address is of a first electronic device, and wherein the destination IP address is of a first server;
    blocking the first data flow when a risk value corresponding to the source IP address falls within a first risk range; and forwarding or blocking, based on the source IP address and the destination IP address, the first data flow when the risk value falls within a second risk range, wherein either a minimum value in the first risk range is greater than a maximum value in the second risk range, or a minimum value in the second risk range is greater than a maximum value in the first risk range, wherein first risks indicated by first risk values in the first risk range are all higher than second risks indicated by second risk values in the second risk range, and wherein forwarding or blocking the first data flow comprises:

forwarding the first data flow when first device attribute information corresponding to the source IP address matches second device attribute information corresponding to the destination IP address, wherein the first device attribute information comprises a first device type and a first service type, wherein the first device type is of the first electronic device, wherein the first service type is accessible by the first device type, wherein the second device attribute information comprises a second device type and a second service type, wherein the second device type is allowed to access the first server, and wherein the second service type is from the first server; and blocking the first data flow when the first device attribute information does not match the second device attribute information.

11. The network security protection method of claim 10, further comprising:

determining a detection identifier corresponding to the destination IP address in the first data flow, wherein the detection identifier is a first identifier or a second identifier, wherein the first identifier indicates that the first server is currently attacked, and wherein the second identifier indicates that the first server is not currently attacked;

determining the first device attribute information corresponding to the source IP address when the detection identifier is the first identifier; and forwarding the first data flow when the detection identifier is the second identifier.

12. A protection device, comprising:
one or more processors;
a network interface coupled to the one or more processors and configured to receive a first data flow, wherein the first data flow comprises a source Internet Protocol (IP) address and a destination IP address, wherein the source IP address is of a first electronic device, and wherein the destination IP address is of a first server; and
a memory coupled to the one or more processors and configured to store instructions that, when executed by the one or more processors, cause the protection device to:

forward the first data flow when first device attribute information corresponding to the source IP address matches second device attribute information corresponding to the destination IP address, wherein the first device attribute information comprises a first device type and a first service type, wherein the first device type is of the first electronic device, wherein the first service type is accessible by the first device type, wherein the second device attribute information comprises a second device type and a second service type, wherein the second device type identifies device that are allowed to access the first server, wherein the second service type is of a service from the first server, and wherein the first device attribute information matches the second device attribute information based on a comparison of the first device type of the first electronic device to the devices identified by the second device type and a comparison of the services identified by the first service type to the service from the first server; and block the first data flow when the first device attribute information does not match the second device attribute information.

13. The protection device of claim 12, wherein the instructions further cause the protection device to:

determine a detection identifier corresponding to the destination IP address, wherein the detection identifier is a first identifier or a second identifier, wherein the first identifier indicates that the first server is currently attacked, and wherein the second identifier indicates that the first server is not currently attacked;

determine a risk value corresponding to the source IP address and block the first data flow when the detection identifier is the first identifier and when the risk value falls within a first risk range;

determine the first device attribute information when the risk value falls within a second risk range, wherein either a minimum value in the first risk range is greater than a maximum value in the second risk range, or a minimum value in the second risk range is greater than a maximum value in the first risk range, and wherein first risks indicated by first risk values in the first risk range are all higher than second risks indicated by second risk values in the second risk range; and forward the first data flow when the detection identifier is the second identifier.

14. The protection device of claim 12, wherein the instructions further cause the protection device to:

determine a risk value corresponding to the source IP address;
block the first data flow when the risk value corresponding to the source IP address falls within a first risk range; and
determine the first device attribute information when the risk value corresponding to the source IP address falls within a second risk range,
wherein either a minimum value in the first risk range is greater than a maximum value in the second risk range, or a minimum value in the second risk range is greater than a maximum value in the first risk range, and
wherein first risks indicated by first risk values in the first risk range are all higher than second risks indicated by second risk values in the second risk range.

15. The protection device of claim 12, wherein the instructions further cause the protection device to:

determine a detection identifier corresponding to the destination IP address in the first data flow, wherein the detection identifier is a first identifier or a second identifier, wherein the first identifier indicates that the first server is currently attacked, and wherein the second identifier indicates that the first server is not currently attacked;

determine the first device attribute information corresponding to the source IP address when the detection identifier is the first identifier; and forward the first data flow when the detection identifier is the second identifier.

16. The protection device of claim 12, wherein the instructions further cause the protection device to:

determine the first device type corresponding to the source IP address using a third-party server; and determine the first service type corresponding to the first device type.

17. The protection device of claim 16, wherein the instructions further cause the protection device to:

invoke an application programming interface (API) Uniform Resource Locator (URL) from the third-party server by using a request, wherein an IP field in the request is filled with the source IP address;

receive data from the third-party server;

parse the data to produce parsed data; and obtain the first device type from the parsed data.

18. The protection device of claim 12, wherein the instructions further cause the protection device to:

determine the first device type using open-source scanning software; and determine the first service type corresponding to the first device type.

19. A protection device, comprising:

one or more processors;

a network interface coupled to the one or more processors;

a memory coupled to the one or more processors and configured to store instructions that, when executed by the one or more processors, cause the protection device to:

receive a first data flow through the network interface, wherein the first data flow comprises a source Internet Protocol (IP) address and a destination IP address, wherein the source IP address is of a first electronic device, and wherein the destination IP address is of a first server;

block the first data flow when a risk value corresponding to the source IP address falls within a first risk range; and forward or block, based on the source IP address and the destination IP address, the first data flow when the risk value falls within a second risk range, wherein either a minimum value in the first risk range is greater than a maximum value in the second risk range, or a minimum value in the second risk range is greater than a maximum value in the first risk range, wherein first risks indicated by first risk values in the first risk range are all higher than second risks indicated by second risk values in the second risk range, and wherein forwarding or blocking the first data flow comprises:

forwarding the first data flow when first device attribute information corresponding to the source IP address matches second device attribute information corresponding to the destination IP address, wherein the first device attribute information comprises a first device type and a first service type, wherein the first device type is of the first electronic device, wherein the first service type is accessible by the first device type, wherein the second device attribute information comprises a second device type and a second service type, wherein the second device type is allowed to access the first server, and wherein the second service type is from the first server; and blocking the first data flow when the first device attribute information does not match the second device attribute information.

20. The protection device of claim 19, wherein the instructions further cause the protection device to:

determine a detection identifier corresponding to the destination IP address, wherein the detection identifier is a first identifier or a second identifier, wherein the first identifier indicates that the first server is currently attacked, and wherein the second identifier indicates that the first server is not currently attacked;

determine the first device attribute information when the detection identifier is the first identifier; and instruct the network interface to forward the first data flow when the detection identifier is the second identifier.

* * * * *

UNITED STATES PATENT AND TRADEMARK OFFICE
CERTIFICATE OF CORRECTION

PATENT NO. : 12,206,685 B2
APPLICATION NO. : 17/851195
DATED : January 21, 2025
INVENTOR(S) : Qiang Li et al.

Page 1 of 1

It is certified that error appears in the above-identified patent and that said Letters Patent is hereby corrected as shown below:

In the Claims

Claim 19, Column 25, Lines 22-23: "more processing;" should read "more processing; and"

Signed and Sealed this
Eighteenth Day of March, 2025

Coke Morgan Stewart
*Acting Director of the United States Patent and Trademark Office*